US008250851B1

(12) United States Patent
Brostmeyer

(10) Patent No.: US 8,250,851 B1
(45) **Date of Patent: *Aug. 28, 2012**

(54) TRANSITION DUCT WITH INTEGRAL GUIDE VANES

(75) Inventor: Joseph D. Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 97 days.

This patent is subject to a terminal disclaimer.

(21) Appl. No.: 13/050,828

(22) Filed: Mar. 17, 2011

Related U.S. Application Data

(63) Continuation of application No. 11/801,595, filed on May 10, 2007, now Pat. No. 7,930,891.

(51) Int. Cl.
*F02C 3/00* (2006.01)

(52) U.S. Cl. ........................................ 60/39.37; 60/796

(58) Field of Classification Search ............ 60/752–760, 60/796–800, 39.37; 415/209.2–209.4, 210.1
See application file for complete search history.

(56) References Cited

U.S. PATENT DOCUMENTS

| | | | | |
|---|---|---|---|---|
| 2,743,579 | A * | 5/1956 | Gaubatz | 60/804 |
| 4,016,718 | A * | 4/1977 | Lauck | 60/796 |
| 7,686,571 | B1 * | 3/2010 | Matheny | 415/9 |
| 2004/0180233 | A1 * | 9/2004 | Stamm | 428/680 |

* cited by examiner

*Primary Examiner* — Phutthiwat Wongwian
(74) *Attorney, Agent, or Firm* — John Ryznic

(57) ABSTRACT

A transition duct used in a gas turbine engine to direct the hot gas flow from the combustor into the turbine section of the gas turbine engine. The transition duct includes a plurality of guide vane integral with the duct. The transition duct includes a circular shaped inlet end for connection to a can combustor and a rectangular and arched shaped outlet end for connection to a first stage turbine section. the guide vanes extend within the flow path between inner and outer projections each having a curved opening in the shape of the airfoil each airfoil includes inner and outer airfoil ends with retainer slots formed between the airfoil ends and the duct projections that form shear pin retainer slots. Shear pin retainers are secured within the slots to secure the guide vanes to the duct in a thermally uncoupled manner to reduce thermal stresses. The guide vanes can be made from a single crystal material for higher gas flow temperatures.

12 Claims, 3 Drawing Sheets

Section A-A

TRANSITION DUCT WITH INTEGRAL GUIDE VANES

CROSS-REFERENCE TO RELATED APPLICATIONS

This application is a CONTINUATION of U.S. patent application Ser. No. 11/801,595 filed May 10, 2007 and entitled TRANSITION DUCT WITH INTEGRAL GUIDE VANES.

GOVERNMENT LICENSE RIGHTS

None.

BACKGROUND OF THE INVENTION

1. Field of the Invention

The present invention relates generally to a gas turbine engine, and more specifically to a transition duct positioned between the combustor and the turbine.

2. Description of the Related Art Including Information Disclosed Under 37 CFR 1.97 and 1.98

In a gas turbine engine, especially an industrial gas turbine engine, includes a combustor that produces a hot gas flow, a multiple stage turbine that extracts mechanical energy from the hot gas flow by producing rotation of the rotor shaft, and a transition duct positioned between the combustor and the turbine to direct the hot gas flow into the turbine section. The combustor section could be a single annular combustor or a plurality of can combustors arranged annularly around the engine.

In the multiple can combustor arrangement, each can combustor is associated with a transition duct. The prior art U.S. Pat. No. 6,890,148 B2 issued to Nordlund on May 10, 2005 and entitled TRANSITION DUCT COOLING SYSTEM shows one of these transition ducts with a circular inlet on the combustor end and a rectangular outlet with an arched configuration on the outlet. A plurality of these transition ducts are arranged around the engine to form an annular outlet leading into the turbine section. In this type of engine, a separate stator vane assembly is secured to the engine between the transition ducts and the turbine inlet.

Several prior art references include a guide vane assembly within the transition duct to avoid the expensive separate production and assembly in addition to the subassemblies of each combustion chamber. U.S. Pat. No. 5,953,919 issued to Meylan on Sep. 21, 1999 and entitled COMBUSTION CHAMBER HAVING INTEGRATED GUIDE BLADES discloses a transition duct with guide blades built into the duct at the end. Other patents that show guide vanes formed with the transition duct are U.S. Pat. No. 2,630,679 issued to Sedille on Mar. 10, 1953 and entitled COMBUSTION CHAMBER FOR GAS TURBINES WITH DIVERSE COMBUSTION AND DILUENT AIR PATHS; and U.S. Pat. No. 3,316,714 issued to Smith et al on May 2, 1967 and entitled GAS TURBINE ENGINE COMBUSTION EQUIPMENT.

One major problem with the above identified prior art transition ducts is that the guide vanes, which are exposed to the highest gas flow temperature within the engine, are thermally coupled to the duct, and as a result experience very high thermal gradients that lead to very high stress levels. This shortens the life of the guide vanes and the portions of the duct that secure the guide vanes. Also, the transition ducts of the prior art do not allow for the capability of airfoils that are made from a single crystal material as in the present invention.

BRIEF SUMMARY OF THE INVENTION

A transition duct for use in a gas turbine engine, the transition duct including a plurality of guide vanes integral with the duct and located on the outlet end. The integral guide vanes are secured to the duct through shear pin retainers such that the guide vane airfoil is uncoupled to the duct. The airfoils are formed without platforms so that a single crystal material can be used, which allows for a higher gas flow temperature. The transition duct with the integral guide vanes can be easily disassembled from the engine and the individual guide vanes replaced without disassembling other parts of the engine.

DETAILED DESCRIPTION OF THE INVENTION

The present invention is a transition duct for use with a gas turbine engine, the transition duct having integral guide vanes secured in the downstream end of the duct. The transition duct with the integral guide vanes guides the flow of hot gas produced within the combustor into the turbine section of the engine. A transition duct of the type used in an industrial gas turbine engine without the integral guide vanes is shown in U.S. Pat. No. 6,890,148 B2 issued to Nordlund on May 10, 2005 of which the entire disclosure is incorporated herein by reference.

Figure 1:
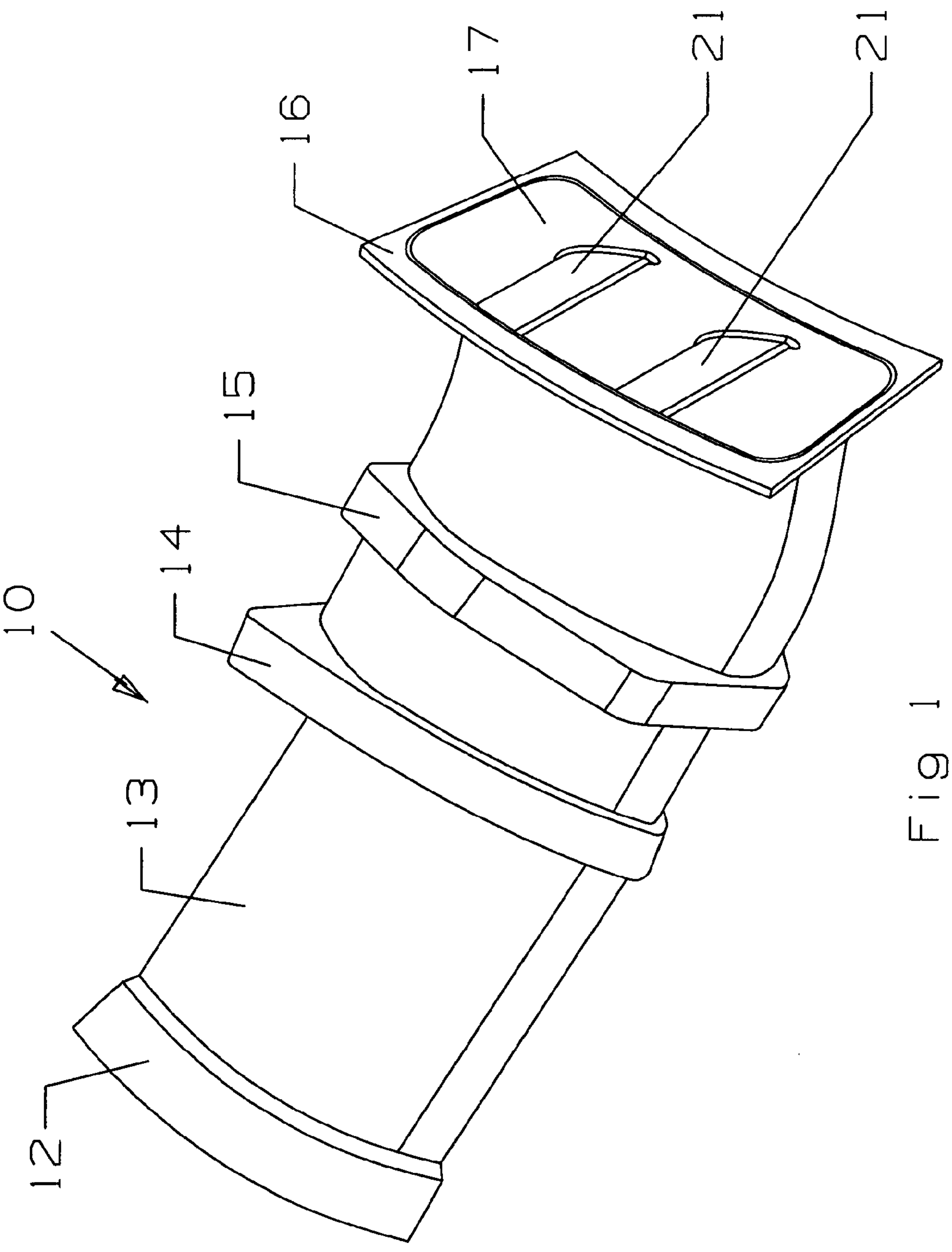
FIG. 1 shows a schematic view of the transition duct with integral guide vanes of the present invention.
Figure 2:
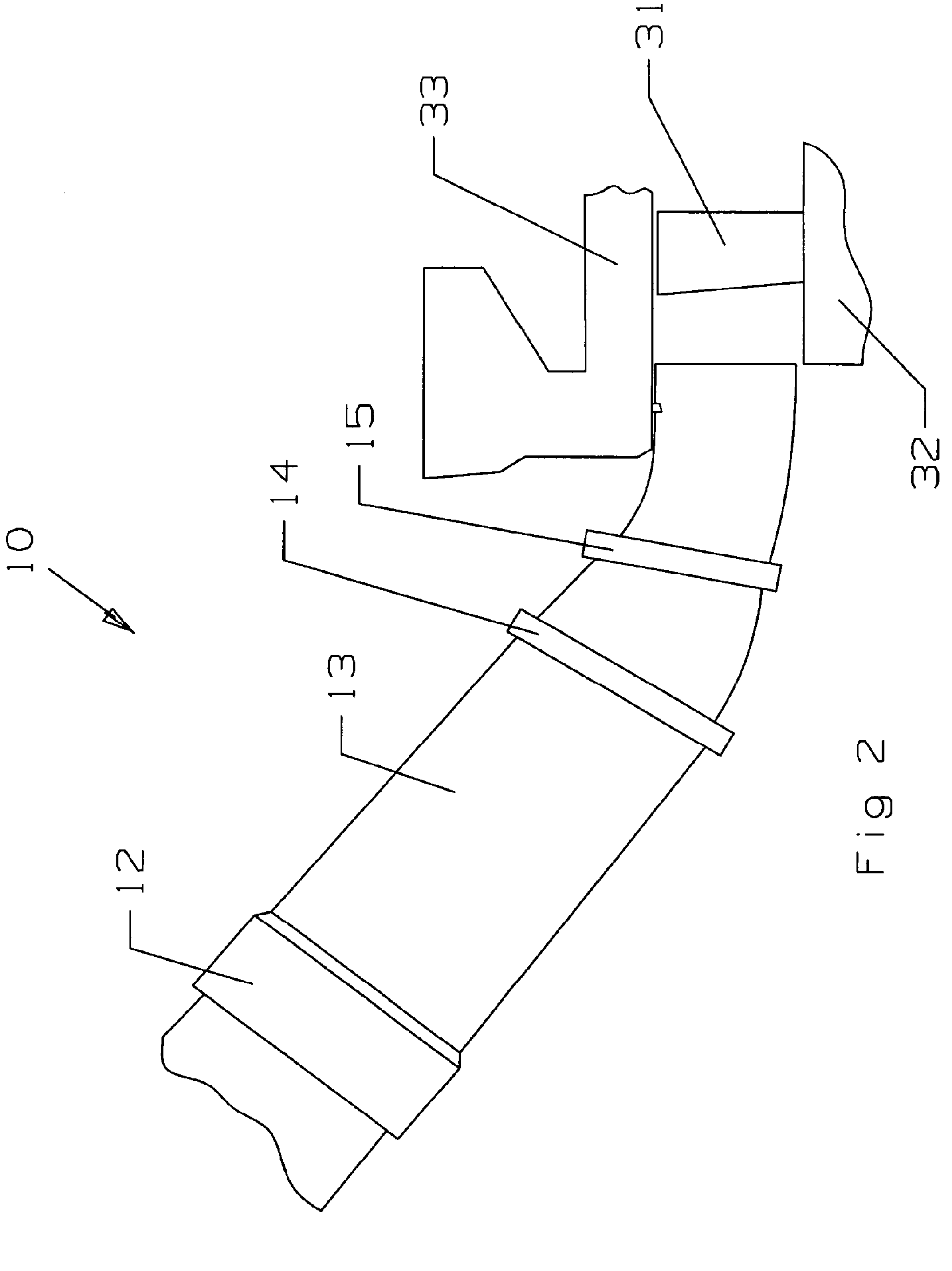
FIG. 2 shows a cross sectional side view of the transition duct of the present invention positioned upstream of the turbine section.

FIG. 1 shows the transition duct 10 of the present invention with the integral guide vanes. The duct 10 includes an inlet end 12 connected to the combustor exit, an outer peripheral wall 13, an exhaust manifold 14, a supply manifold 15, and an outlet end 16 connected to the turbine section. Only one of a plurality of the transition ducts 10 is shown in FIG. 1. A number of these transition ducts 10 are arranged to form an annular flow path leading into the turbine section. Positioned within the outlet end 16 of the duct are a number of guide vanes 21 that form a flow path with the inner wall 17 of the transition duct 10. The guide vanes 21 are positioned to direct the hot gas flow into the turbine section as seen in FIG. 2. The turbine section includes a first stage rotor disc 32 with a plurality of first stage rotor blades 31 that rotate within the outer shroud 33 stationary with the casing.

Figure 3:
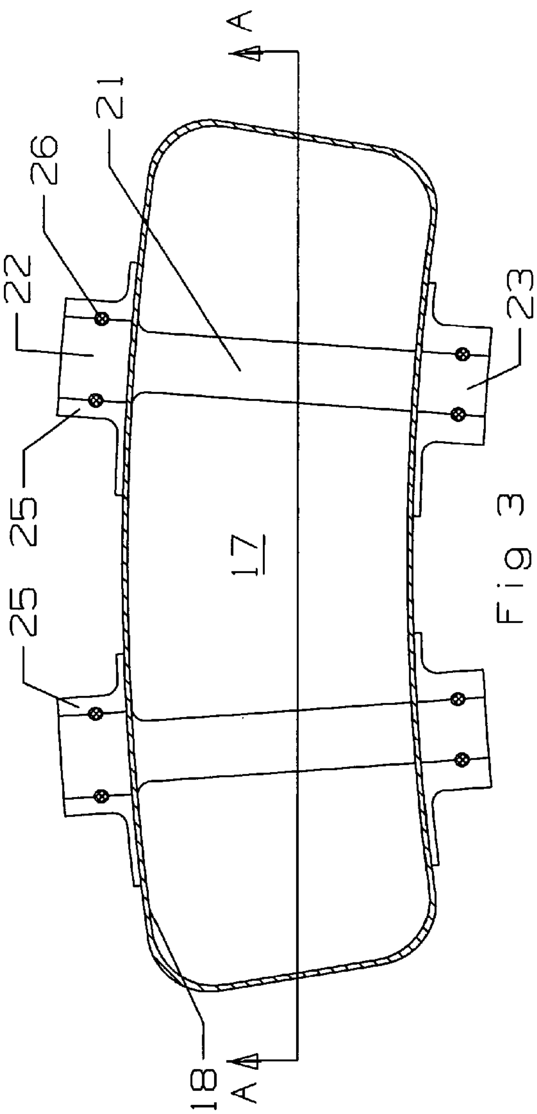
FIG. 3 shows a cross sectional front view of a transition duct on the outlet end of the present invention.
Figure 4:
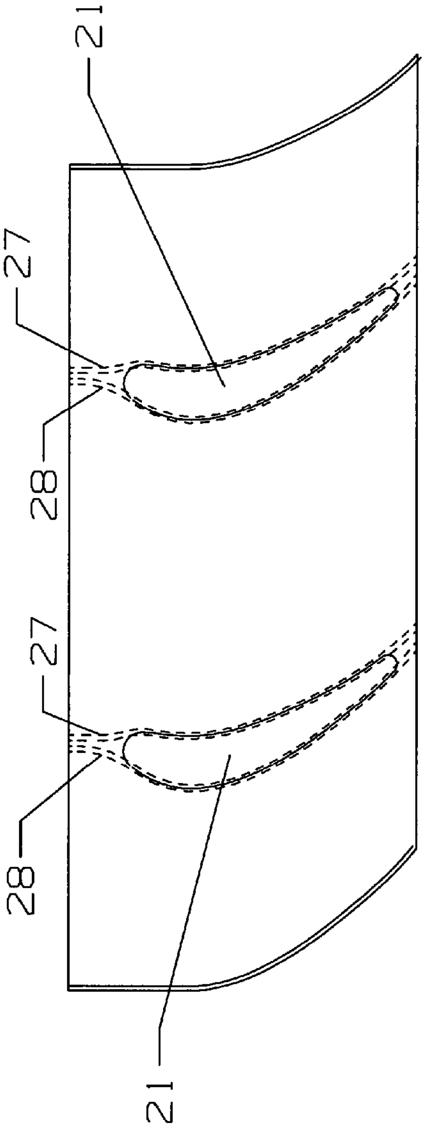
FIG. 4 shows a cross sectional view of the junction between the guide vanes and the transition duct of the present invention.

The main feature of the present invention is the method in which the guide vanes 21 are secured to the transition duct 10. FIGS. 3 and 4 show this connection. FIG. 3 shows a front view looking into the outlet end of the transition duct. The duct forms a flow path or space 17 within the duct for the hot gas flow to pass. A thermal barrier coating (TBC) 18 is typically applied to the inner flow surface to thermally protect the duct. On the outer and inner surfaces of the duct are airfoil support projections 25 which can be formed as part of the duct 10 or secured to the duct after the duct is formed. The outer vane support projections are located on the outer portion of the duct 10, and inner vane support projections are located on the inner portion of the duct 10. Each guide vane 21 includes an airfoil portion, an outer end 22 and an inner end 23. The outer end inner ends 22 and 23 are secured to the projections formed on the duct 10. the airfoil portion of the vane is curved from the leading edge to the trailing edge. The inner and outer ends 22 and 23 also follow the airfoil curvature. The projections 25 on the duct have opening that are curved such that the ends of the vane will be supported within the openings.

Each support projection includes shear pin retainer slots 27 and 28 that extend along the pressure side and the suction side of the guide vane as seen in FIG. 4. Half of the slot is formed on the support projection and the other half is formed on the airfoil 21. A shear pin retainer 26 is secured within the slot to retain the guide vane within the duct 10. Four shear pin retainers 26 are used to secure each guide vane to the projections of the duct 10. Each of the slots that form the space for the shear pin retainer 26 follows the shape of the airfoil in order. The slots open onto one ore both sides of the projections in order to install and remove the retainers 26. Because of this structure, the guide vane can be made from a single crystal material. FIG. 3 shows two guide vanes 21 secured within the duct 10. However, more than two vanes can be secured within the duct depending upon the flow space 17 formed within the individual duct 10. as seen in FIG. 4, the two sides of each transition duct has a curvature the same as the curvature of the guide vanes so that the hot gas flow along the duct sides also is directed into the first stage turbine blades. The outlet direction of the duct side walls is about the same as the outlet direction of the guide vanes.

With the transition duct 10 having the guide vane securing projections of the present invention, the guide vanes can be uncoupled to the support structure so that the large thermal gradients that exist between the duct and the guide vanes can be accounted for. The high thermal stresses that would occur between the duct and the guide vane in the cited prior art would be significantly reduced by uncoupling the vanes from the duct. This would allow for a longer service life for the guide vanes. Also, individual guide vanes can be easily removed from the duct once the duct is removed from the engine.

The invention claimed is:

1. A transition duct for use in a gas turbine engine comprising:
- an inlet end that directly connects to a can combustor exit and an outlet end that connects to a turbine and a hot gas flow path between the inlet end and the outlet end;
- a first stage guide vane secured within the transition duct adjacent to the outlet end of the transition duct and
- wherein the inlet end of the transition duct is substantially circular shaped in cross section and, the outlet end of the transition duct being substantially rectangular and arched shape in cross section.

2. The transition duct of claim 1, and further comprising:
- an outer airfoil mounting projection having an airfoil shaped opening;
- an inner airfoil mounting projection having an airfoil shaped opening;
- the inner and outer airfoil mounting projections located adjacent to the outlet end of the transition duct;
- the first stage guide vane having an airfoil shaped with an outer securing end and an inner securing end, the airfoil inner and outer ends fitting within the inner and outer airfoil shaped openings;
- retainer slots formed within the airfoil shaped openings and the airfoil inner and outer ends to receive a retainer; and,
- a shear pin retainer secured within the retainer slots to secure the first stage guide vane to the transition duct.

3. The transition duct of claim 2, and further comprising:
- the retainer slots follow a curvature of the airfoil shaped with a pressure side retainer slot and a suction side retainer slot.

4. The transition duct of claim 2, and further comprising:
- The first stage guide vane is thermally uncoupled from the inner and the outer mounting projections.

5. The transition duct of claim 1, and further comprising:
- a plurality of guide vanes secured to the transition duct.

6. The transition duct of claim 1, and further comprising:
- the first stage guide vane is formed of a single crystal material.

7. The transition duct of claim 1, and further comprising:
- The first stage guide vane is located immediately upstream from a first stage rotor blade in the turbine.

8. The transition duct of claim 1, and further comprising:
- the transition duct includes sides with a curvature substantially the same as the curvature of the first guide vane to guide the hot gas flow into the first stage turbine blades.

9. An industrial gas turbine engine comprising:
- a compressor connected to a turbine by a rotor shaft;
- a can combustor having an inlet with a circular shaped that connected to an outlet of the compressor;
- a transition duct having an inlet with a circular shaped that connected to an outlet of the can combustor and an outlet with an arched rectangular shape connected to an inlet of a turbine;
- the turbine having a first row of turbine rotor blades located at an inlet to the turbine; and,
- a first stage guide vane secured within the transition duct adjacent to the outlet end of the duct and positioned upstream from the first row of turbine rotor blades to guide a hot gas stream from the combustor into the first row of rotor blades.

10. The industrial gas turbine engine of claim 9, and further comprising:
- The first stage guide vane is formed of a single crystal material.

11. The industrial gas turbine engine of claim 9, and further comprising:
- an outer airfoil mounting projection having an airfoil shaped opening;
- an inner airfoil mounting projection having an airfoil shaped opening;
- the inner and outer airfoil mounting projections located adjacent to the outlet end of the transition duct; the first stage guide vane is thermally uncoupled from the inner and the outer mounting projections.

12. The industrial gas turbine engine of claim 9, and further comprising:
- the transition duct includes sides with a curvature substantially the same as the curvature of the first stage guide vane to guide the hot gas flow into the first stage turbine blades.

* * * * *